United States Patent
Lutzer

(10) Patent No.: US 6,854,769 B2
(45) Date of Patent: Feb. 15, 2005

(54) FLEXIBLE BELLOWS-TYPE PIPE JUNCTION FOR JOINING SPACED PIPE ENDS

(75) Inventor: Wilhelm Lutzer, Zarpen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/757,758

(22) Filed: Jan. 14, 2004

(65) Prior Publication Data

US 2004/0146339 A1 Jul. 29, 2004

(30) Foreign Application Priority Data

Jan. 16, 2003 (DE) .......................... 103 01 374

(51) Int. Cl.[7] .............................. F16L 27/10; F16L 51/02

(52) U.S. Cl. ...................... 285/226; 285/227; 285/229

(58) Field of Search ................................. 285/226, 227, 285/229, 331, 110, 114

(56) References Cited

U.S. PATENT DOCUMENTS

| | | | | |
|---|---|---|---|---|
| 3,473,833 A | * | 10/1969 | Bremer | 285/285.1 |
| 3,768,457 A | * | 10/1973 | Beasey | 126/550 |
| 4,508,374 A | * | 4/1985 | Kantor | 285/319 |
| 4,679,827 A | * | 7/1987 | Law | 285/151.1 |
| 4,717,181 A | * | 1/1988 | Maier | 285/229 |
| 5,269,570 A | * | 12/1993 | Nunley | 285/229 |
| 5,506,376 A | * | 4/1996 | Godel | 181/208 |
| 6,315,332 B1 | * | 11/2001 | Aschoff et al. | 285/227 |

* cited by examiner

Primary Examiner—James M. Hewitt
(74) Attorney, Agent, or Firm—W. F. Fasse; W. G. Fasse

(57) ABSTRACT

A bellows-type pipe junction for mechanically joining the spaced-apart ends of two pipes in a liquid-tight manner includes two sleeve sections fitted onto the two pipe ends and a flexible offset section joined at its two ends to the two sleeve sections by respective flexible bellows-type joints. The flexible offset section and the flexible bellows-type joints provide a fluid-tight junction while accommodating axial and radial offsets between the two pipe ends. The pipe junction is especially suitable for joining the pipes of an aircraft drain mast.

20 Claims, 2 Drawing Sheets

FLEXIBLE BELLOWS-TYPE PIPE JUNCTION FOR JOINING SPACED PIPE ENDS

This application is based on and claims the priority under 35 U.S.C. §119 of German Patent Application 103 01 374.1, filed on Jan. 16, 2003, the entire disclosure of which is incorporated herein by reference.

FIELD OF THE INVENTION

The invention relates to a bellows-type boot or pipe junction for mechanically joining the ends of two pipes that are spaced apart from each other at a prescribed spacing and that are provided for conveying flowable media such as liquids or gases therein. The invention specially relates to a pipe junction arrangement of drain pipes for a drain mast in an aircraft.

BACKGROUND INFORMATION

A commercial passenger transport aircraft typically includes a drain mast through which wastewater or the like can be drained and expelled from the aircraft. In this context, an end of a pipe extending from the drain mast must be connected to a counterpart end of a pipe extending from the aircraft fuselage. The two pipe ends must be joined in a mechanically tight and liquid-tight manner. With respect to the pipe junction, the pipe extending from the aircraft can be regarded as the in-feed pipe while the pipe extending to the drain mast can be regarded as the out-feed pipe.

For installing a drain mast, these pipe ends are typically joined to each other by a bellows-type boot or pipe junction. However, due to construction and installation tolerances of the in-feed pipe and the out-feed pipe, the two pipe ends are not exactly aligned and exactly properly positioned relative to each other. As a result thereof, the pipe junction must be somewhat forced into place in order to try to accommodate or bridge the mis-alignments or tolerances, which gives rise to tensions or other stresses in the installed pipe junction, which often lead to damage such as tearing, puncturing, rupturing, or kinking of the pipe junction itself. Such damage especially arises due to the high degree of stiffness or rigidity of the conventionally known bellows-type pipe junctions in the area of the offset between the two pipe ends that are to be joined.

SUMMARY OF THE INVENTION

In view of the above, it is an object of the invention to provide a bellows-type boot or pipe junction for achieving a mechanically secure and liquid-tight and gas-tight connection between two pipe ends while allowing axial and radial offsets of the two pipe ends without giving rise to stresses in the pipe junction and without causing mechanical damage to the pipe junction. The invention further aims to avoid or overcome the disadvantages of the prior art, and to achieve additional advantages, as apparent from the present specification. The attainment of these objects is, however, not a required limitation of the invention.

The above objects have been achieved according to the invention in a bellows-type pipe junction for joining the respective ends of an in-feed pipe and an out-feed pipe that are spaced apart from one another and that are provided and adapted to convey a flowable medium therein, such as a liquid or gas, or a flowable bulk material. According to the invention, the pipe junction includes a sleeve-shaped, preferably substantially cylindrical, inlet section that fits over and encloses the end portion of the in-feed pipe, a sleeve-shaped, preferably substantially cylindrical, outlet section that fits over and encloses the end portion of the out-feed pipe, and a flexible offset section that extends between and is respectively joined to the inlet section and the outlet section by respective flexible joints that provide a mechanically secure and liquid-tight and air-tight connection.

Preferably, the entire pipe junction including the inlet section, the offset section, and the outlet section is integrally and monolithically formed from a single material, preferably a flexible material, such as rubber, an elastomer, or another flexible polymer. The flexible joints joining the opposite ends of the offset section respectively to the inlet section and to the outlet section are integral or monolithic, flexible, folded bellows-type joints that allow some degree of axial and radial offsetting or movement between the inlet section and the offset section, and between the offset section and the outlet section, while maintaining a mechanically secure and liquid-tight and air-tight connection.

Thereby, and due to the flexibility of the offset section itself, the inventive pipe junction is able to accommodate a certain range of radial or lateral as well as axial offset and tolerance between the two ends of the respective pipes, without excessive stresses arising in the pipe junction, so that damage of the pipe junction, such as tearing, kinking, rupturing or the like is avoided.

Further preferred features of the invention are as follows. The upstream flexible joint at the in-feed end of the offset section can be arranged inside the end portion of the in-feed pipe. Thereby, this upstream flexible joint may comprise a folded or serpentine bellows-type joint between the inlet section and the offset section of the pipe junction, with this folded or serpentine bellows-type joint arranged inside the end of the in-feed pipe and engaging or receiving the pipe wall of the end of the in-feed pipe.

In one particular embodiment, the downstream flexible joint at the out-feed, end of the offset section is arranged protruding outside the pipe end of the out-feed pipe, and is internally protected through the arrangement of an annular lip seal protruding from the downstream end of the offset section of the pipe junction into the pipe end of the out-feed pipe.

An alternative embodiment of the downstream flexible joint does not include an annular lip seal extending into the interior of the pipe end of the out-feed pipe, but has a folded or overlapping conical or funnel configuration of the bellows-type flexible joint. Namely, this joint configuration includes a flared funnel portion that flares conically outwardly from the pipe end of the out-feed pipe, and a folded or serpentine bellows-type transition from the downstream end of the offset section to the flared portion adjoining the pipe end of the out-feed pipe. This arrangement could be said to follow the principle of overlapping roof shingles.

According to another feature of the invention, the outlet section of the pipe junction fitted onto and enclosing the end portion of the out-feed pipe may further include an axially compressible or crushable zone, e.g. in the manner of a cylindrical bellows including several circumferentially extending folds or pleats having a sectional zig-zag configuration. Such a bellows pleat zone provides an additional axial adaptability to allow for a greater range of axial offsets and movement between the two pipe ends.

While the inlet section and the outlet section of the pipe junction are preferably cylindrical, they could have any tube-like or pipe-like configuration matching the configuration of the exterior of the respective pipe ends to be joined.

For example, if the pipe ends have a square cross-section, then the inlet section and the outlet section of the pipe junction would also have a square cross-section. Generally, the inlet section and the outlet section are hollow shells having a shape and diameter or cross-section adapted to the shape, diameter and cross-section of the respective pipe ends to be joined.

The arrangement of the pipe junction may further include pipe clamps or the like tightly encircling and clamping the free ends of the inlet and outlet sections of the pipe junction around the respective end portions of the pipes to be joined. These pipe clamps or the like can have any conventionally known configuration, construction, and utilization.

BRIEF DESCRIPTION OF THE DRAWINGS

In order that the invention may be clearly understood, it will now be described in connection with example embodiments with reference to the accompanying drawings, wherein.

DETAILED DESCRIPTION OF PREFERRED EXAMPLE EMBODIMENTS AND THE BEST MODE OF THE INVENTION

Figure 1:
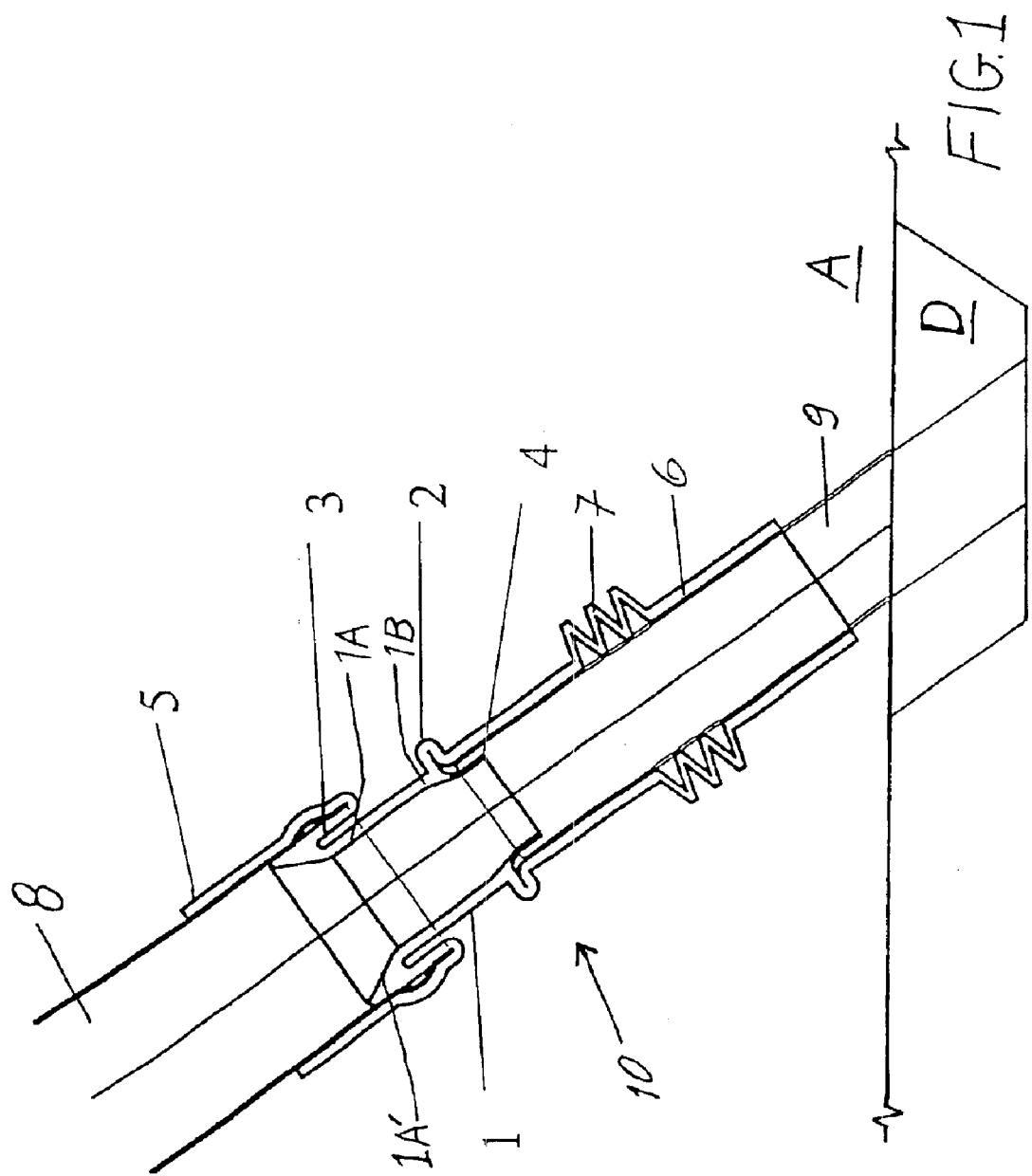
FIG. 1 is a schematic sectional view of a bellows-type pipe junction according to the invention tightly joining an end of an in-feed pipe to an end of an out-feed pipe of an aircraft drain mast.

FIG. 1 schematically shows a bellows-type pipe junction 10 according to the invention, for mechanically joining the respective free ends of two pipes, namely an in-feed pipe 8 and an out-feed pipe 9 in a liquid-tight manner. These pipes 8 and 9, are, for example, pipes delivering water to a drain mast D of an aircraft A, for draining or expelling the water from the aircraft. In this context, the respective free ends of the two pipes 8 and 9 are axially spaced or offset from each other, and may or may not be in radial alignment with each other along a single central axis as illustrated. Namely, there may also be a radial offset due to the non-alignment of the two pipe ends. The pipe junction 10 must accommodate and bridge these axial and radial offsets while joining the pipe ends of the pipes 8 and 9 in a mechanically secure and liquid-tight manner.

The bellows-type pipe junction 10 includes a hollow sleeve-shaped inlet section 5 that is fitted onto the outside of the end portion of the in-feed pipe 8, a hollow sleeve-shaped outlet section 6 that is fitted onto the outside of the end portion of out-feed pipe 9, and a flexible offset section 1 connected and extending between the inlet section 5 and the outlet section 6. Particularly, the upstream or inlet end 1A of the offset section 1 is joined via a flexible inlet joint 3 to the inlet section 5, while the downstream or outlet end 1B of the offset section 1 is joined via a flexible outlet joint 2 to the outlet section 6. These two flexible joints 2 and 3 are each preferably an integral or monolithic continuation of the material of the offset section 1 on the one hand, and of the inlet section 5 or outlet section 6 on the other hand, so as to form a continuous uninterrupted connection or joint between the offset section 1 and the inlet or outlet sections 5 or 6. Furthermore, each joint 2 or 3 has a bellows configuration including at least one fold or serpentine undulation of the material forming the pipe junction, so as to provide flexibility along with a secure mechanical connection through the respective joint.

The upstream or inlet joint 3 can be configured particularly to be arranged inside the open inner diameter of the pipe end of the in-feed pipe 8. In this regard, the flexible joint 3 includes three successively connected, coaxial, overlapping portions having different diameters and forming a Z- or S-shaped folded or undulating shape in cross-section between the inlet section 5 and the offset section 1. The end of the pipe wall of the in-feed pipe 8 is received in a cylindrical space between the outer pairing of the undulations or serpentine folds, while the other space between the inner pairing of the undulations or serpentine folds remains open to the outside and allows for flexibility in this joint location.

It can also be seen that the upstream or inlet end 1A of the offset section 1 extends into the end portion of the in-feed pipe 8 at this area, and includes a flaring or tapering end transition 1A' adjoining and conically transitioning from the smaller inner diameter of the offset section 1 to the larger inner diameter of the in-feed pipe 8.

At the opposite end of the offset section 1, namely at the downstream or outlet end 1B, the offset section 1 preferably includes an annular lip seal 4 that extends into the interior or inner diameter of the end of the out-feed pipe 9. In this embodiment, the flexible joint 2 comprises an externally protruding folded or bellows-type rim joining the offset section 1 to the outlet section 6.

At least the outlet section 6 (but alternatively or additionally also the inlet section 5) may further include an axially compressible or crushable zone 7 in the manner of a pleated bellows, to provide a further degree of axial flexibility and adaptability.

Figure 2:
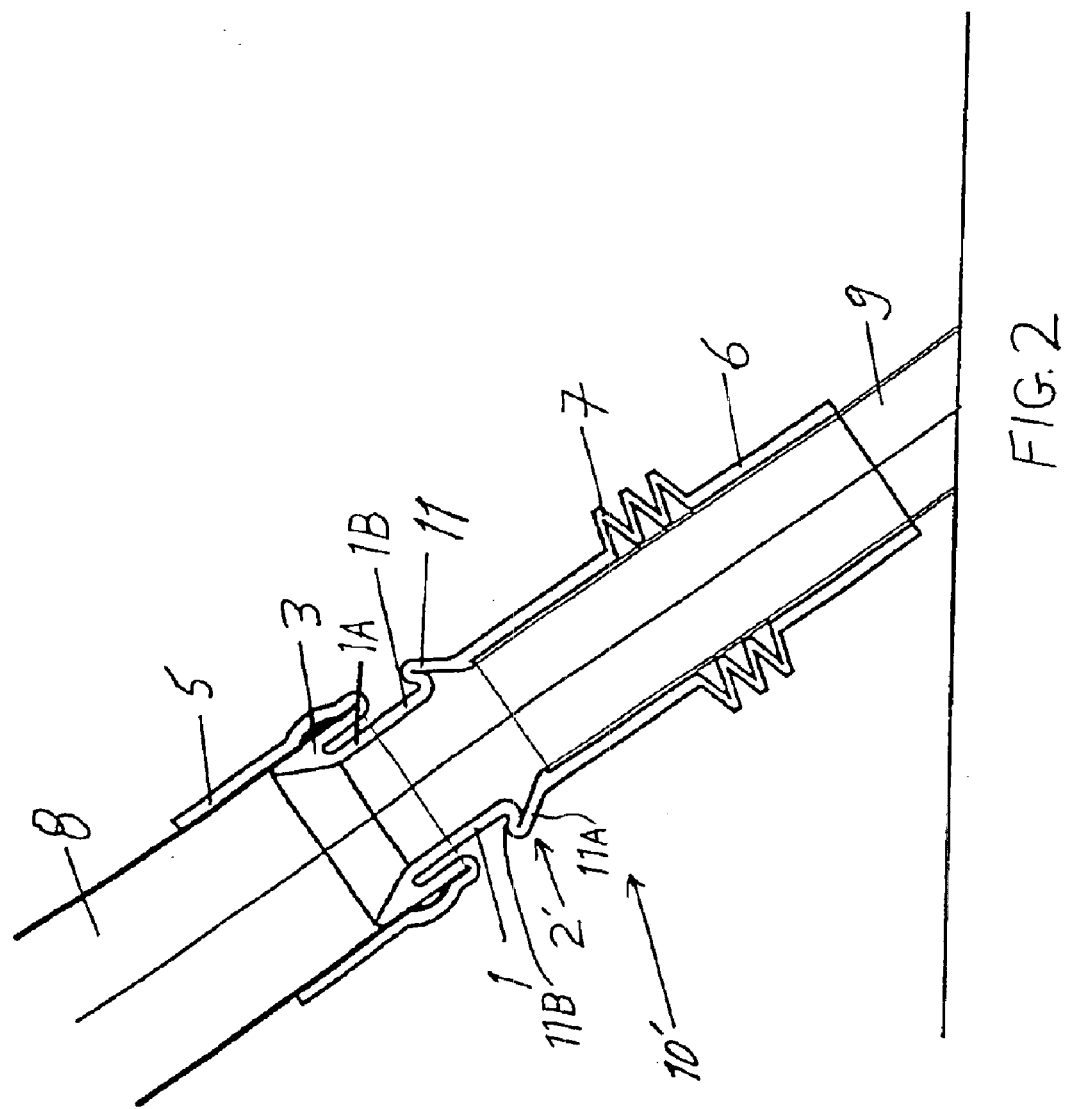
FIG. 2 is a schematic sectional view of another embodiment of a bellows-type pipe junction according to the invention generally similar to FIG. 1, but with a different configuration of the downstream flexible joint thereof.

FIG. 2 shows a further embodiment of a bellows-type pipe junction 10' according to the invention, which basically corresponds to the pipe junction 10 shown in FIG. 1, whereby corresponding components are labeled with the same reference numbers, and will not be redundantly described here. The only difference between the embodiment of FIG. 2 and that of FIG. 1 relates to the configuration and construction of the pipe junction at the downstream or outlet end 1B thereof. Namely, the pipe junction 10' of FIG. 2 does not include an internal annular lip seal 4 like the pipe junction 10, and has a different configuration of the flexible joint 2' in comparison to the flexible joint 2 of the pipe junction 10 of FIG. 1.

In the present embodiment of the pipe junction 10', the flexible joint 2' involves a folded bellows-type transition 11 that could be said to involve the principle of overlapping roof shingles or of a flared pipe joint, namely with a smaller-diameter pipe member inserted into the outwardly flared end of a second pipe member. Particularly, in the present context, the bellows-type transition 11 includes an outwardly flaring conical portion 11A that flares outwardly from the outlet section 6, and a folded or undulating bellows-type transition 11B that transitions from the pipe-shaped body of the offset section 1 to the larger-diameter flared portion 11A. This configuration of the bellows-type transition 11 allows for radial and axial adaptability or accommodation of tolerances.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A bellows-type pipe junction for joining a first pipe end of a first pipe with a second pipe end of a second pipe having a spacing distance between the first pipe end and the second pipe end, said pipe junction comprising:
- a first sleeve section configured and dimensioned to be fitted onto the first pipe end;
- a second sleeve section configured and dimensioned to be fitted onto the second pipe end;
- a flexible offset section located and extending between said first and second sleeve sections, having a first end adjacent to said second sleeve section and a second end adjacent to said second sleeve section;
- a first flexible joint connecting said first end of said offset section with said first sleeve section; and
- a second flexible joint connecting said second end of said offset section with said second sleeve section;
- and further including at least one feature selected from the group consisting of:
- a first feature wherein said first flexible joint comprises three coaxial portions that have different diameters and overlap each other and are successively joined to one another to form a Z- or S-shaped cross-sectional configuration, having an externally open gap between an innermost one and a middle one of said coaxial portions, and having a gap adapted to receive a pipe wall of the first pipe end between an outermost one and said middle one of said coaxial portions,
- a second feature wherein said first end of said offset section includes a transition portion that has a conically tapering inner diameter and that is configured to be plugged into the first pipe end,
- a third feature wherein said second end of said offset section includes an annular lip seal configured and dimensioned to extend into the second pipe end, and
- a fourth feature wherein said second flexible joint comprises a conically flared portion extending and conically outwardly flaring from said second sleeve section, and an undulating bellows portion transitioning from a smaller diameter of said second end of said offset section to a larger diameter of said flared portion.

2. The bellows-type pipe junction according to claim 1, wherein said first and second flexible joints are respective first and second folded bellows joints.

3. The bellows-type pipe junction according to claim 1, wherein said first and second sleeve sections, said offset section, and said first and second flexible joints are all integral and continuous with one another and form a single monolithic component consisting of a single continuous material.

4. The bellows-type pipe junction according to claim 1, wherein said first flexible joint at said first end of said offset section is arranged and configured to be located in or extend into the first pipe end.

5. The bellows-type pipe junction according to claim 1, including said first feature.

6. The bellows-type pipe junction according to claim 1, including said second feature.

7. The bellows-type pipe junction according to claim 1, including said third feature.

8. The bellows-type pipe junction according to claim 1, wherein said second flexible joint comprises a radially outwardly protruding folded rim arranged between and joining said second end of said offset section and said second sleeve section.

9. The bellows-type pipe junction according to claim 1, including said fourth feature.

10. The bellows-type pipe junction according to claim 1, wherein said second sleeve section includes an axially compressible bellows portion.

11. A pipe joint arrangement comprising:
- a first pipe having a first pipe end;
- a second pipe having a second pipe end spaced apart from said first pipe end; and
- a bellows-type pipe junction that joins said first pipe end with said second pipe end;
- wherein said pipe junction comprises:
- a first sleeve section fitted onto maid first pipe end;
- a second sleeve section fitted onto said second pipe end;
- a flexible offset section located and extending between said first and second sleeve sections, having a first end adjacent to said first sleeve section and a second end adjacent to said second sleeve section;
- a first flexible joint connecting said first end of said offset section with said first sleeve section; and
- a second flexible joint connecting said second end of said offset section with said second sleeve section;
- and said pipe junction further includes at least one feature selected from the arout consisting of:
- a first feature wherein said first flexible joint comprises three coaxial portions that have different diameters and overlao each other and are successively joined to one another to form a Z- or S-shaped cross-sectional configuration, having an externally open gap between an innermost one and a middle one of said coaxial portions, and having a gap receivine a pipe wall of said first pine end between an outermost one and said middle one of said coaxial portions,
- a second feature wherein said first end of said offset section includes a transition portion that has a conically tapering inner diameter and that is plugged into said first pine end,
- a third feature wherein said second end of said offset section includes an annular lip seal that extends into said second pipe end, and
- a fourth feature wherein said second flexible joint comprises a conically flared portion extending and conically outwardly flaring from said second sleeve section, and an undulating bellows portion transitioning from a smaller diameter of said second end of said offset section to a larger diameter of said flared portion.

12. In an aircraft having an aircraft fuselage, a first pipe having a first pipe end in or extending from said fuselage, a drain mast mounted on said fuselage and including a second pipe having a second pipe end, and a bellows-type pipe junction joining said first pipe end with said second pipe end,
an improvement wherein said pipe junction comprises:
- a first sleeve section fitted onto said first pipe end;
- a second sleeve section fitted onto said second pipe end;
- a flexible offset section located and extending between said first and second sleeve sections, having a first end adjacent to said first sleeve section and a second end adjacent to said second sleeve section;
- a first flexible joint connecting said first end of said offset section with said first sleeve section; and
- a second flexible joint connecting said second end of said offset section with said second sleeve section.

13. The improvement in the aircraft according to claim 12, wherein said first flexible joint comprises three coaxial portions that have different diameters and overlap each other and are successively joined to one another to form a Z- or S-shaped cross-sectional configuration, having an externally open gap between an innermost one and a middle one of said coaxial portions, and having a gap receiving a pipe wall of said first pipe end between an outermost one and said middle one of said coaxial portions.

14. The improvement in the aircraft according to claim 12, wherein said first end of said offset section includes a transition portion that has a conically tapering inner diameter and that is plugged into said first pipe end.

15. The improvement in the aircraft according to claim 12, wherein maid second end of said offset section includes an annular lip seal that extends into said second pipe end.

16. The improvement in the aircraft according to claim 12, wherein said second flexible joint comprises a conically flared portion extending and conically outwardly flaring from said second sleeve section, and an undulating bellows portion transitioning from a smaller diameter of said second end of said offset section to a larger diameter of said flared portion.

17. The pipe joint arrangement according to claim 11, wherein said pipe junction includes said first feature.

18. The pipe joint arrangement according to claim 11, wherein said pipe junction includes said second feature.

19. The pipe joint arrangement according to claim 11, wherein said pipe junction includes said third feature.

20. The pipe joint arrangement according to claim 11, wherein said pipe junction includes said fourth feature.

* * * * *

UNITED STATES PATENT AND TRADEMARK OFFICE
CERTIFICATE OF CORRECTION

PATENT NO. : 6,854,769 B2
DATED : February 15, 2005
INVENTOR(S) : Wilhelm Lutzer It is certified that error appears in the above-identified patent and that said Letters Patent is hereby corrected as shown below:

Column 6,
Line 26, after "the", replace "arout" by -- group --;
Line 29, before "each", replace "overlao" by -- overlap --;
Line 33, after "gap", replace "receivine" by -- receiving --;
Lines 34 and 39, after "first", replace "pine" by -- pipe --.

Column 7,
Line 15, after "wherein", replace "maid" by -- said --.

Signed and Sealed this

Sixteenth Day of August, 2005

JON W. DUDAS
*Director of the United States Patent and Trademark Office*